United States Patent Office 2,960,598
Patented Nov. 15, 1960

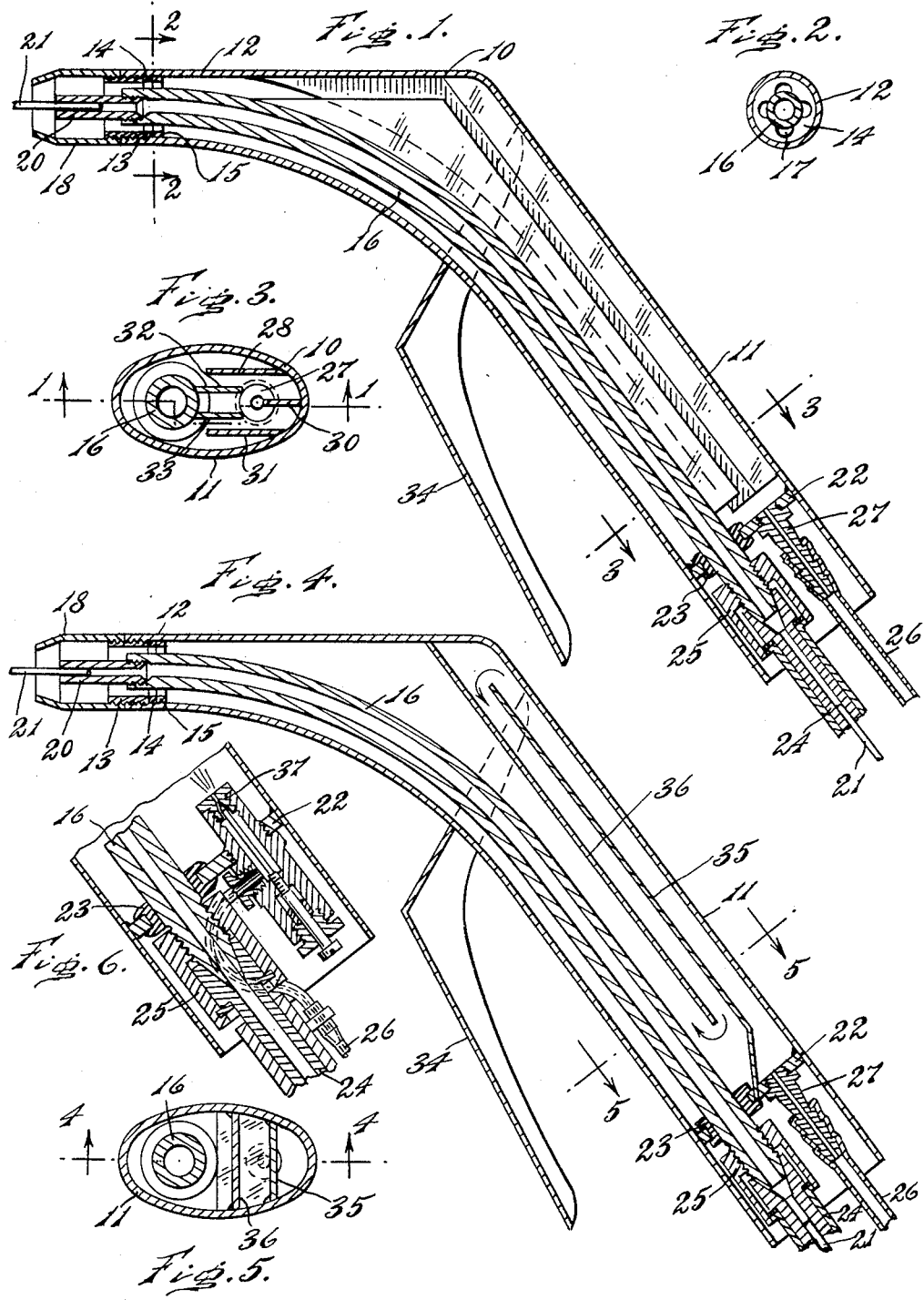

2,960,598

WELDING TORCH

Jacques Roland Paul Verhaeghe, Woluwe, St. Pierre, Belgium, and Royal David Thomas, Jr., Narberth, James E. Norcross, Media, John K. Light, Bala-Cynwyd, and Rene D. Colinet, Philadelphia, Pa., assignors to La-Soudure Electrique Autogene, S.A., Brussels, Belgium, a corporation of Belgium Filed Oct. 20, 1958, Ser. No. 768,159

18 Claims. (Cl. 219—130)

The present invention relates to a method of cooling arc welding torches of the character which are used in conjunction with a substantial flow of arc protective gas to prevent direct contact between the air and the arc plasma which joins the electrode to the work.

A purpose of the invention is to develop effective heat transfer between the protective gas and the torch body by the use of fins or baffles in the torch which, along with the gas passage, are bathed in the protective gas for heat transfer purposes.

A further purpose is to convey a protective gas to the torch as a liquid and there expand and evaporate the gas so as to cool the torch.

A further purpose is to provide a heat transfer fin on the outside of the torch and desirably use that fin as a shield between the arc and the handle.

The present invention is particularly useful in recent arc welding processes using carbon dioxide gas as a protective atmosphere for the arc, because the low cost of such gas, as compared with monoatomic gases, permits larger outputs than are normally considered commercially acceptable with argon or helium, and also because the carbon dioxide gas flows through the torch at a relatively lower temperature than any inert gas, because of the cooling effect of evaporation of the carbon dioxide from the liquid state in the cylinder or other compressed supply source, in addition to expansion in the gaseous state to low pressure in the regulator or flowmeter, which is used to control the gas flow. Both of these are favorable to more efficient torch cooling.

Most gas-shielded arc welding torches have been water-cooled. Therefore the particular advantages of the present invention will be readily apparent. Water-cooling requires a water inlet hose and a water outlet hose in addition to the gas hose and the cable. Furthermore, where water-cooling is used the torch much be of an intricate watertight construction. It is also necessary to have a source of cold water, usually a utility water supply, with flow control valves and a drain to dispose of the used water.

A welding torch in accordance with the present invention which is cooled by the carbon dioxide gas alone greatly simplifies the construction and operation of the torch, as well as eliminating the cost of water consumption.

The invention overcomes the difficulty in the prior art by proper design of the torch itself. The supply of gas was previously available, and it is merely necessary to accomplish heat transfer effectively from the torch to the incoming gas before discharging the gas to the nozzle. As a further advantage, it will be evident that reheating of the carbon dioxide is favorable to the action of the arc, first because any possible droplets of water are removed, which might if present cause porosities in the weld. Such droplets of water have been encountered when using imperfectly dried carbon dioxide. The presence of such water has required the welding industry to procure from gas suppliers a specially dry or so-called "welding grade" of carbon dioxide. To assure perfect dryness of the carbon dioxide it has been the practice to use electric heaters to warm up the gas at the cylinder before or after expansion. This does not remove water which might be present but it evaporates the water so that it becomes harmless to the weld. Whether such heater is used or not, the torch of the present invention provides additional safety against the presence of water droplets at the nozzle and at the arc.

The very favorable effect of the invention is to increase the deposition rate in welding, by reducing the heat required to bring the protective atmosphere to final temperature.

The invention therefore involves a combination of means to create the heat transfer from the torch or wire guide to the gas flow through the torch or wire guide.

The following features are desirably included:

(1) The internal passage in the torch body is enlarged to maximum size compatible with the weight and bulk of the torch, the limitation being the convenience of the welder and the ability to gain access to the work in close quarters. In fully automatic welding, the wire guide is desirably increased in external diameter and length to the limit compatible with the proper operation of the supporting mechanism.

(2) All insulation covering of the torch body is eliminated. This insulation is normally used to prevent direct contact between the hot body of the torch and the hand of the welder, as a protection against heat and electric shock. In the present invention, the omission of the insulation gives additional area for the gas cooling torch passage. The insulation may be maintained on the handle only, while the body is preferably made of an uncovered thin shell of very high thermal conductive material such as copper. The external surface of this shell should preferably be bright and of light color for maximum reflection of the radiant heat emitted by the arc. Electrical insulation, apart from heat insulation, is still provided, but by other means.

(3) The inner contact surfaces of the torch and the gas flow through it is increased. This is accomplished by installing internal fins and/or baffles which force the gas to flow against numerous metal projections which are thermally connected to the source of heat (which is the arc itself, and the flow of current through the wire guide to the nozzle of the torch), and also to the wire guide inside the torch.

(4) In addition one or more external fins are attached to the body of the torch to assist in heat transfer to the outside air. In the particular embodiment, one such fin is shaped and sized to act as the conventional shield which protects the hand of the operator against radiation from the arc. This shield is made of highly thermally conductive metal and attached to the torch in a manner which provides maximum heat conduction, preferably by welding.

For greater deposition efficiency in welding, as well as comfort of the operator, cooling of the torch is very important. In semiautomatic arc welding, using a continuous consumable electrode, the deposition rate is limited by the maximum heat which the operator can tolerate. The only possible remedy, if the torch becomes unbearably hot, is to reduce the welding current. In reducing the welding current, we reduce the deposition rate. Thus the invention is a considerable factor in increasing the deposition rate in welding.

In a preferred embodiment of the invention, the torch body is a thin shell of copper sheet uncovered and exposed externally and internally, there being no insulation on the body. The shell connects directly to the nozzle which directs the gas around the arc. Heat flows freely and directly from the nozzle to the torch body and from the torch body to the gas which is admitted at the opposite end of the gas passage through the torch body. The gas may even flow through the handle which forms an extension of the space occupied for cooling purposes. While the gas may be admitted to the torch directly or through a trigger valve under the control of the operator, we have chosen to illustrate the form in which the gas flow is controlled outside the torch by automatic action triggered by the arc itself as well known.

We also illustrate a variation in which the carbon dioxide is fed to the torch in liquid form through a tiny flexible high pressure hose connected to the valve of a standard syphon-type carbon dioxide cylinder. Evaporation and expansion of the carbon dioxide from liquid to gas takes place inside the torch and preferably inside the handle through a small adjustable orifice which preferably takes the form of a needle valve. This valve functions as an effective refrigerator unit to cool the torch by direct metal-to-metal conduction. In this form of the invention, the handle is cooled chiefly by conduction from the sudden liberation of a compressed volatile liquid absorbing the heat evaporation from its own sensibile heat, with marked drop in the temperature in the gas and in the valve, while the torch body is cooled mostly by convection as in gas-fed torches.

The inside cavity or passage of the torch body is provided with a multiplicity of fins and/or baffles made of thin metallic sheets, preferably of copper. These sheets are fixed to the torch body and/or to the wire guide by heat-conductive connections such as welds, or by casting. It is preferable not to use rivets or screws as they are not as effective from the standpoint of heat conduction. Fins divide the gas stream in several flows which are parallel, while baffles force the stream to extend its path lengthwise in a single flow.

The welding electrode passes through the torch body and is guided in a tubular wire guide which ends desirably in the center of the gas nozzle. The wire guide also conducts the welding current from the electric cable in the handle of the torch to the contact tip inside the gas nozzle, where the current transfers to the welding electrode. The cable connection, the tubular wire guide and the tip are not thermally insulated, and they bathe freely in the carbon dioxide stream, but they are electrically insulated from the torch body by suitable transverse washers of glass fiber or suitable plastic, provided with holes or apertures for free gas flow.

In the drawings we have chosen to illustrate a few only of the numerous embodiments in which the invention may appear, selecting the forms shown from the standpoints of convenience in illustration, satisfactory operation and clear demonstration of the principles involved.

Figure 1 is a central longitudinal section on the line 1—1 of Figure 3 and showing a torch provided with internal fins and one external fin in accordance with the invention.

Figure 2 is a section on the line 2—2 of Figure 1, through the insulator separating the body from the wire guide.

Figure 3 is an enlarged section on the line 3—3 of Figure 1, showing the fins attached to the handle and to the wire guide.

Figure 4 is a central longitudinal section on the line 4—4 of Figure 5, showing a variant embodiment of the invention, in which the torch is provided with baffles.

Figure 5 is an enlarged section on the line 5—5 of Figure 4, showing the internal baffles of the handle and body.

Figure 6 is a fragmentary central section showing a torch provided with an expansion orifice for vaporizing the gas.

In Figure 1, the torch body 10 comprises a handle portion 11 near the rear end, and a nose portion 12 near the front end. The body comprises a single thin wall metallic shell. At the front end a threaded bushing 13, threaded into threads on the interior of the body, holds an insulating washer 14 best seen in Figure 2, suitably of fiber glass or heat resistant plastic, against fixed ring 15 secured as by welding at the inside of the body. The washer 14 by engagement with its inner projections grips curved metal welding wire guide 16 centrally located with respect to the forward end of the body. Apertures 17 at the inner edge of the washer permit through passage of gas from the torch body 10 to the suitably circular converging nozzle 18 which is threaded on the bushing 13. As well known, the gas is discharged through the nozzle to the welding arc. The threaded bushing 13, thermally conductive, connects the nozzle to the body 10.

A metallic wire tip 20 is threaded into the end of the wire guide and thermally conducts the heat to the wire guide. A consumable welding electrode 21, which is broken away through the torch for convenience in illustration, enters through a hollow cable to be described and is discharged as the welding electrode centrally located with respect to the annular form of the nozzle.

At the rear end of the torch, a suitable metallic separator wall 22 closes the rear end of the handle and is secured to the body as by welding. The separator wall 22 has an opening which receives a suitable rubber grommet 23 which surrounds and electrically insulates the wire guide 16 from the torch body. A hollow flexible metallic welding cable 24, suitably insulated on the outside and having an opening through the center for passing the consumable electrode 21, is connected to the wire guide by a suitable conventional disconnectible coupling 25 which is spaced and therefore insulated from the body of the torch.

Gas to protect the welding arc enters the torch through hose 26 connected to a standard inlet nipple 27.

The handle 11 and the portion of the body forward of the handle are provided with heat conducting metallic internal fins 28, 30 and 31 suitably spaced and parallel and connected as by welding to the body as best seen in Figure 3. The wire guide likewise is provided with suitable parallel longitudinally extending heat conducting metallic fins 32 and 33 which are desirably anchored with respect to the fins 28, 30 and 31 and do not physically touch the fins 28, 30 and 31 so that electrical insulation is maintained. The fin 30 is conveniently shorter than the fins 28 and 31 so as not to unduly impede gas flow.

The torch body also is provided with one external heat conductive metallic fin 34 suitably welded to the body and shaped and sized to form a shell to protect the hand of the welder against direct arc radiation.

A modified form of the torch of the invention is shown in Figures 4 and 5. In this form, the construction is the same as that previously described, except that baffles 35 and 36 are interposed in the path of gas flow from the gas inlet to the nozzle so as to greatly lengthen the gas path. Of course, the designer may choose any combination of baffles and fins as desired.

It will, of course, be evident that other embodiments of the invention may be employed without departing from the principles as defined in the claims. The forms illustrated in the drawings are presented from the standpoint of illustration without intending to limit.

In some cases, it is preferable to bring the protective gas in liquid form through the hose 26 to an expansion orifice, shown in Figure 6 as an adjustable needle valve 37 which is placed in the handle in heat transfer relation with the body so that the cooling effect when the gas evaporates and expands in passing through the internal passage in the body is effective.

Since liquid-to-metal heat transmission is greater than gas-to-metal heat transfer for a given surface of contact, it may be advantageous to extend the tubing 26 into a loop or coil inside the torch body and/or handle before allowing the liquified gas to evaporate.

In operation it will be evident that the electrode is guided by the wire guide and receives electrical connection at the wire tip 20. The gas enters through the hose 26 and flows through the internal passage which surrounds the wire guide to maintain heat transfer relation with the interior of the body directly and also through the fins of Figures 1-3, or the baffles of Figures 4 and 5. Accordingly, very effective heat transfer is accomplished since heat which reaches the torch from the arc is absorbed by the gas passing through the torch, thus heating up the gas and evaporating any liquid moisture.

At the same time, the external fin 34 serves to transfer heat to the air and to protect the hand of the welder against radiation.

In some cases, as in Figure 6, the cooling effect of the gas is increased by evaporating and expanding the gas on the inside of the torch.

In view of our invention and disclosure, variations and modifications to meet individual whim or particular need will doubtless become evident to others skilled in the art to obtain all or part of the benefits of our invention without copying the structure shown, and we, therefore, claim all such insofar as they fall within the reasonable spirit and scope of our claims.

Having thus described our invention, what we claim as new and desire to secure by Letters Patent is:

1. In an arc welding torch for gas shielded welding, a hollow conductive metal body having a gas-tight passage extending therethrough for a stream of protective gas, a connection to a source of protective gas at the rear end of said passage, a nozzle for discharging said gas, conductively connected to the body at the forward end of said passage, and means for mounting an electrode on the torch which electrode extends through the nozzle, in combination with heat transfer surface means conductively attached to the body extending into area contact with the gas in the passage, the walls of the passage and the heat transfer surface means bathing in said protective gas before it emerges through the nozzle outside the torch.

2. A torch of claim 1, in which the connection to the source of protective gas supplies protective gas in liquid form, in combination with expansion orifice means in the torch causing evaporation and expansion of gas entering the passage.

3. A torch of claim 1, in combination with a nozzle and external metallic fin attached to the body, forming a shield between the arc and the handle.

4. A torch of claim 1, in which the outside of the body is highly polished, uncovered and of light coloration to assure reflection of radiant heat from the arc.

5. A torch of claim 1, in which the heat transfer surface means comprises fin means.

6. A torch of claim 5, in which the connection to the source of protective gas supplies protective gas in liquid form, in combination with expansion orifice means in the torch causing evaporation and expansion of gas entering the passage.

7. A torch of claim 1, in which the heat transfer surface means comprises baffle means lengthening the passage.

8. A torch of claim 7, in which the connection to the source of protective gas supplies protective gas in liquid form, in combination with expansion orifice means in the torch causing evaporation and expansion of gas entering the passage.

9. In an arc welding torch for semiautomatic and fully automatic gas shielded welding using a continuous consumable welding electrode, a hollow conductive metal body having a gas-tight passage extending therethrough for a stream of protective gas, connection to a source of protective gas at the rear end of said passage, a nozzle for discharging said gas conductively connected to the body at the forward end of said passage, and a wire guide and cable connection mounted on the body and adapted to guide the welding electrode through the nozzle, in combination with heat transfer surface means conductively attached to at least one of the members consisting of the body and the wire guide and extending in area contact with the gas passage, the walls of the passage and the fin means bathing in said protective gas before it emerges through the nozzle outside the torch.

10. A torch of claim 9, in which the connection to the source of protective gas supplies protective gas in liquid form, in combination with a gas expansion orifice located in the torch between the connection to the source of protective gas and the passage, the gas evaporating and expanding adjacent the orifice.

11. A torch of claim 9, in combination with a handle on the body, and an external fin attached to the body forming a shield between the arc and the handle.

12. A torch of claim 9, in which the outside surfaces of the body are highly polished, uncovered and of light coloration to assure reflection of radiant heat from the arc.

13. A torch of claim 9, in which the heat transfer surface means comprises fin means.

14. A torch of claim 13, in which the connection to the source of protective gas supplies protective gas in liquid form, in combination with expansion orifice means in the torch causing evaporation and expansion of gas entering the passage.

15. A torch of claim 9, in which the heat transfer surface means comprises baffle means lengthening the passage.

16. A torch of claim 15, in which the connection to the source of protective gas supplies protective gas in liquid form, in combination with expansion orifice means in the torch causing evaporation and expansion of gas entering the passage.

17. In a welding torch, a hollow body of heat conducting material, means for supplying protective gas under pressure to the rear end of the hollow interior of the body, a nozzle at the forward end of the body connected to the hollow interior, and means for supporting an electrode in spaced relation at the nozzle, in combination with heat transfer surfaces connected to the body and exposed on both sides to the gas on the interior of the body.

18. A torch of claim 17, in combination with a metallic wire guide supported in the body in spaced relation to the body and completely surrounded by the gas.

References Cited in the file of this patent

UNITED STATES PATENTS

| | | |
|---|---|---|
| 2,281,335 | Somes | Apr. 28, 1942 |
| 2,416,374 | Brunberg | Feb. 25, 1947 |
| 2,536,726 | Cornwall | Jan. 7, 1951 |
| 2,727,970 | Turbett | Dec. 20, 1955 |
| 2,870,320 | Mathews | Jan. 20, 1959 |